United States Patent
Chen

(10) Patent No.: US 11,378,861 B2
(45) Date of Patent: Jul. 5, 2022

(54) DISPLAY PANEL AND DISPLAY DEVICE

(71) Applicant: Shenzhen China Star Optoelectronics Semiconductor Display Technology Co., Ltd., Guangdong (CN)

(72) Inventor: Lixuan Chen, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 276 days.

(21) Appl. No.: 16/771,293

(22) PCT Filed: Apr. 27, 2020

(86) PCT No.: PCT/CN2020/087299
§ 371 (c)(1),
(2) Date: Jun. 10, 2020

(87) PCT Pub. No.: WO2021/196326
PCT Pub. Date: Oct. 7, 2021

(65) Prior Publication Data
US 2022/0113604 A1    Apr. 14, 2022

(30) Foreign Application Priority Data
Apr. 2, 2020    (CN) .......................... 202010254309.9

(51) Int. Cl.
*G02F 1/1677*    (2019.01)
*G02F 1/1676*    (2019.01)
(Continued)

(52) U.S. Cl.
CPC ............ *G02F 1/1677* (2019.01); *G02F 1/167* (2013.01); *G02F 1/1676* (2019.01);
(Continued)

(58) Field of Classification Search
CPC ............... G02F 1/16762; G02F 1/1676; G02F 1/16766; G02F 1/1677; G02F 1/167; G09G 3/344
See application file for complete search history.

(56) References Cited

U.S. PATENT DOCUMENTS 7,283,119 B2 * 10/2007 Kishi ...................... G02F 1/167
  345/84
7,382,351 B2 *  6/2008 Kishi ................... G09G 3/3446
  349/86
(Continued)

FOREIGN PATENT DOCUMENTS

CN         1504821 A     6/2004
CN       101199209 A     6/2008
(Continued)

*Primary Examiner* — Vinh T Lam

(57) ABSTRACT

A display panel and a display device, including a display area and a non-display area are disclosed. The display panel includes: a first substrate and a second substrate disposed opposite to each other, a first electrode and a second electrode, a plurality of charged particles, and a plurality of third electrodes. By respectively controlling different bias voltages of the electrodes in the display area and the third electrode in the non-display area, the present application can realize a capability of switching between different working states of the display panel.

18 Claims, 2 Drawing Sheets

(51) Int. Cl.
  *G02F 1/167* (2019.01)
  *G09G 3/34* (2006.01)
  *G02F 1/16762* (2019.01)
  *G02F 1/16766* (2019.01)

(52) U.S. Cl.
  CPC ...... *G02F 1/16762* (2019.01); *G02F 1/16766* (2019.01); *G09G 3/344* (2013.01)

(56) References Cited

U.S. PATENT DOCUMENTS

| | | | |
|---|---|---|---|
| 7,436,577 B2 * | 10/2008 | Moriyama | G02F 1/167 349/33 |
| 7,474,295 B2 | 1/2009 | Matsuda | |
| 7,733,325 B2 * | 6/2010 | Hamaguchi | G02F 1/167 345/107 |
| 8,144,116 B2 * | 3/2012 | Nagayama | G02F 1/167 359/228 |
| 8,797,634 B2 * | 8/2014 | Paolini, Jr. | G02F 1/16757 345/107 |
| 8,804,227 B2 * | 8/2014 | Kwon | G02F 1/167 359/296 |
| 2003/0231162 A1 | 12/2003 | Kishi | |
| 2010/0060628 A1 * | 3/2010 | Lenssen | G02F 1/167 345/107 |
| 2019/0129270 A1 * | 5/2019 | Ishizaki | G02F 1/16753 |
| 2019/0250481 A1 | 8/2019 | Xu et al. | |

FOREIGN PATENT DOCUMENTS

| | | | | |
|---|---|---|---|---|
| CN | 102445804 A | | 5/2012 | |
| CN | 104317132 A | | 1/2015 | |
| CN | 106324937 A | | 1/2017 | |
| CN | 108303832 A | | 7/2018 | |
| CN | 108983528 A | * | 12/2018 | ......... G02F 1/13306 |
| CN | 110928075 A | | 3/2020 | |
| JP | 2003270674 A | | 9/2003 | |
| JP | 2007193182 A | | 8/2007 | |

* cited by examiner

DISPLAY PANEL AND DISPLAY DEVICE

FIELD OF INVENTION

The present application relates to the field of display technology, in particular to a display panel and a display device.

BACKGROUND OF INVENTION

With the advance of digital technology, more and more display devices that disseminate information enter people's lives. For example, liquid crystal displays have been widely used in communications, information, and consumer electronic products. However, the liquid crystal displays need to be continuously supplied with power during their display process, which makes electronic papers (EP) advantageous in that they can maintain display for extended periods even after power is off. In addition, electronic paper saves more power than liquid crystal displays during use.

A traditional EP display is a bistable reflective display, which has advantages of energy efficiency and great readability in bright environments. On the basis of black and white electronic paper display, companies such as EINK have developed a colorful electronic paper display to enhance display effect. However, devices such as EP generally do not have a transparent display function. If the electronic paper is set to a transparent design similar to a liquid crystal display, a transparent area needs to be designed directly outside the display area, and the reflective display area is spatially separated from the transparent display area.

TECHNICAL PROBLEM

The above spatial separation design has the following disadvantages: on the one hand, its transparency is actually negatively correlated to an area of the display area. In order to achieve high transparency, an area of the display area needs to be reduced. On the other hand, a transparent area always exists, which affects the display effect when reflecting. For example, the transparency of a transparent LCD is generally below 25%, which sacrifices its color saturation, brightness, and contrast.

SUMMARY OF INVENTION

The present application provides a display panel and a display device, which can solve the problems caused by the spatial separation of the reflective display area and the transparent display area in the prior art display panel.

In order to solve the above technical problems, one solution adopted in this application is: a display panel is provided, which includes a display area and a non-display area. The display panel includes: a first substrate and a second substrate disposed opposite to each other; a first electrode and a second electrode, wherein the first electrode is disposed on a side of the first substrate in the display area, and the second electrode is correspondingly disposed on a side of the second substrate close to the first substrate in the display area; a plurality of charged particles disposed between the first electrode and the second electrode, wherein the plurality of charged particles include first charged particles and second charged particles; a plurality of third electrodes disposed on the first substrate and/or the second substrate in the non-display area. By respectively controlling different bias voltages of the first electrode and second electrode in the display area and the third electrode in the non-display area, the plurality of charged particles can be accumulated to the electrodes in the display area or the electrodes in the non-display area based on the different bias voltages, so as to realize the switching of different working states of the display panel.

In order to solve the technical problems, another solution adopted in this application is: a display device is provided. The display device includes a display panel. The display panel includes: a first substrate and a second substrate disposed opposite to each other; a first electrode and a second electrode, wherein the first electrode is disposed on a side of the first substrate in the display area, and the second electrode is correspondingly disposed on a side of the second substrate close to the first substrate in the display area; a plurality of charged particles disposed between the first electrode and the second electrode, wherein the plurality of charged particles include first charged particles and second charged particles; a plurality of third electrodes disposed on the first substrate and/or the second substrate in the non-display area. By respectively controlling different bias voltages of the first electrode and second electrode in the display area and the third electrode in the non-display area, the plurality of charged particles can be accumulated to the electrodes in the display area or the electrodes in the non-display area based on the different bias voltages, so as to realize the switching of different working states of the display panel.

BENEFICIAL EFFECT

The beneficial effects of this application are: a display panel and a display device are provided. By designing an additional third electrode outside a display area of a display panel that is different from electrodes in the display area, and the third electrode is independently connected with signal to output positive and negative bias voltages, and respectively controlling different bias voltages of the first electrode and second electrode in the display area, and the third electrode in the non-display area, the plurality of charged particles can be accumulated to electrodes in the display area or electrodes in the non-display area based on the different bias voltages, thereby realizing switching of working states of the display panel.

DESCRIPTION OF DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

DETAILED DESCRIPTION OF PREFERRED EMBODIMENTS

The technical solutions in the embodiments of the present application will be described clearly and completely with reference to the drawings in the embodiments of the present application. Obviously, the embodiments are only a part of the embodiments of the present application, but not all the embodiments. Based on the embodiments of the present application, all other embodiments obtained by a person of ordinary skill in the art without creative work fall into the protection scope of the present application.

Unless otherwise defined, all technical and scientific terms used herein have the same meaning as commonly understood by those skilled in the technical field of the present application. The terminology used in the specification of the application herein is only for the purpose of describing specific embodiments, and is not intended to limit the application. The terms "comprising" and "having" and any variations thereof in the description and claims of the present application and the description of drawings are intended to cover a non-exclusive inclusion. The terms "first", "second", etc. in the description and claims of the present application or the description of drawings are used to distinguish different objects, not to describe a specific order.

Reference herein to "embodiments" means that specific features, structures, or characteristics described in connection with the embodiments may be included in at least one embodiment of the present application. The phrase in various places in the specification does not necessarily refer to the same embodiment, nor is it an independent or alternative embodiment mutually exclusive with other embodiments. Those skilled in the art understand explicitly and implicitly that the embodiments described herein can be combined with other embodiments.

Figure 1:
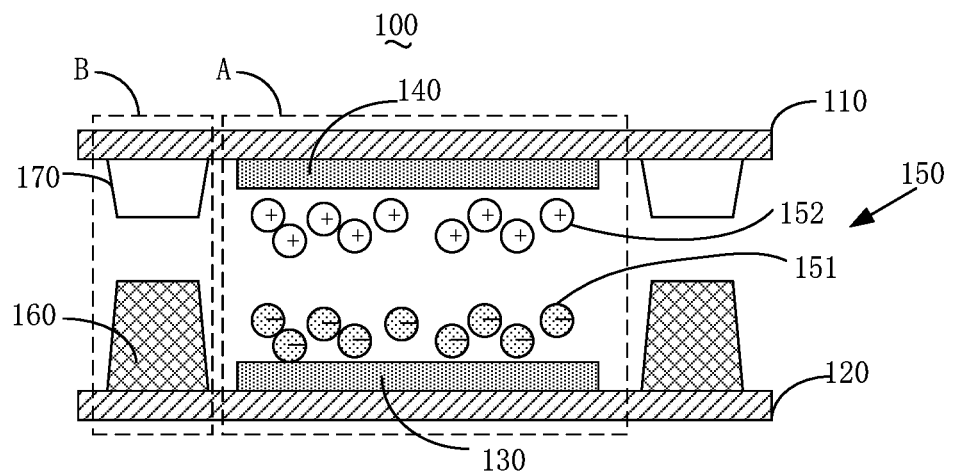
FIG. 1 is a cross-sectional schematic structural diagram of a display panel in a first embodiment of the present application.

Please refer to FIG. 1, which is a cross-sectional schematic structural diagram of a display panel in a first embodiment of the present application. As shown in FIG. 1, a display panel 100 provided by the present application includes a display area A and a non-display area B. The display panel 100 further includes a first substrate 110 and a second substrate 120 disposed opposite to each other, a first electrode 130, a second electrode 140, a plurality of charged particles 150, and a plurality of third electrodes 160.

Optionally, the first substrate 110 provided by this application can be an array substrate. The array substrate may include a substrate (not shown) and a thin film transistor (not shown) on the substrate, wherein the thin film transistor includes at least a channel layer (not shown), a source (not shown), a drain (not shown) and a gate (not shown). The substrate can be a transparent substrate, and can specifically be a glass substrate, which is not limited here.

For the second substrate 120, reference may be made to the upper substrate structure of a current VA liquid crystal display, but one difference is that there is no alignment film layer (PI layer) on the second substrate 120 in the present application.

The first electrode 130 is disposed on a side of the first substrate 110 in the display area A, and the second electrode 140 is correspondingly disposed on a side of the second substrate 120 close to the first substrate 110 in the display area A. Optionally, the first electrode 130 and the second electrode 140 of this application adopt transparent materials, such as indium tin oxide or zinc aluminum oxide (Al-doping-ZnO), etc., which is not specifically limited herein. The first electrode 130 and the second electrode 140 in the display area A can be connected to an independent thin-film transistor (TFT) for active addressing and independent control. They can also be controlled by a passive matrix addressing signal scanning without using a TFT.

The plurality of charged particles 150 disposed between the first electrode 130 and the second electrode 140 includes first charged particles 151 and second charged particles 152.

Optionally, in this embodiment, the first charged particles 151 can be black charged particles, and the second charged particles 152 can be white charged particles. Certainly, the first charged particles 151 can be white charged particles, and the second charged particles 152 can be black charged particles. Certainly, the color of the charged particles in this application can also be red, green, or blue, which is not specifically limited here. The first charged particles 151 and the second charged particles 152 have opposite electrical properties. In this embodiment, the first charged particles 151 are negatively charged, and the second charged particles 152 are positively charged.

Further, the display panel of the present application further includes a transparent electrophoretic liquid (not shown) disposed between the first substrate 110 and the second substrate 120, and a plurality of charged particles 151 move in the transparent electrophoretic liquid. When the display area A works normally, that is, when positive and negative voltages are applied to the first electrode 130 and the second electrode 140, respectively, a plurality of charged particles 150 will gather at the first electrode 130 and the second electrode 140 under an effect of the electric field, respectively. In this embodiment, the positive voltage is applied to the first electrode 130, and the negative voltage is applied to the second electrode 140. At this time, the first charged particles 151 are accumulated to the first electrode 130, and the second charged particles 152 are accumulated to the second electrode 140, thus achieving a reflective display. Conversely, the negative voltage is applied to the first electrode 130, and the positive voltage is applied to the second electrode 140. At this time, the first charged particles 151 are accumulated to the second electrode 140, and the second charged particles 152 are accumulated to the first electrode 130. In this way, a black screen in the display area can be realized.

With reference to FIG. 1 together. The display panel 100 provided by the present application further includes a plurality of third electrodes 160. In this embodiment, the third electrodes 160 are disposed at the non-display area B of the first substrate 110. Specifically, the plurality of third electrodes 160 are positioned on the first substrate 110 and spaced apart on both sides of the first electrode 130. Optionally, the third electrode 160 can be transparent or translucent, or non-transparent. In a case where the third electrode 160 is transparent or translucent, the material of the third electrode 160 includes one or more of indium tin oxide (ITO), indium zinc oxide (IZO), or zinc aluminum oxide (AZO). In a case where the third electrode 160 is non-transparent, the material of the third electrode 160 includes one or more of silver (Ag), copper (Cu), and aluminum (Al).

Optionally, like the first electrode 130 and the second electrode 140, the third electrode 160 can also be connected to an independent thin-film transistor (TFT) for active addressing and independent control. It can also be controlled by a passive matrix addressing signal scanning without using a TFT.

Figure 2:
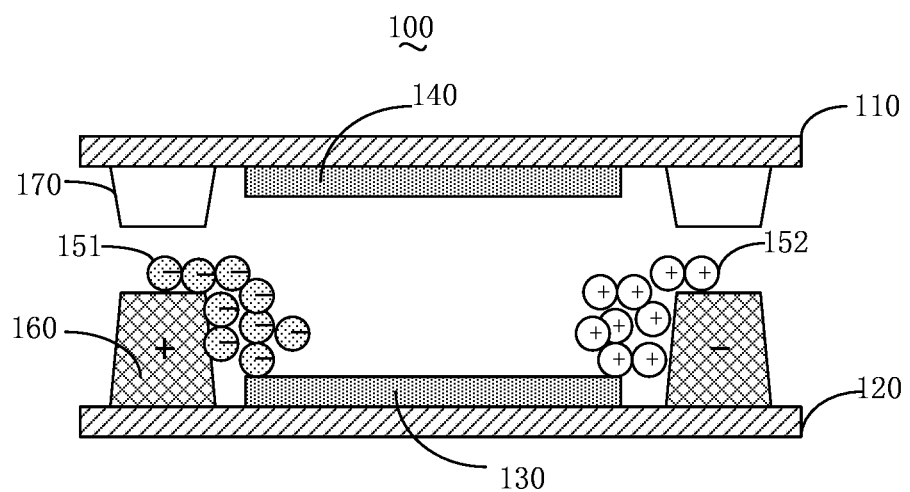
FIG. 2 is a schematic diagram of the working state of the display panel in a first embodiment of the present application.

With reference to FIG. 2 together, FIG. 2 is a schematic diagram of the working state of the display panel in a first embodiment of the present application. As shown in FIG. 2, after the input of the first electrode 130 and the second electrode 140 in the display area A is interrupted, that is, the electrodes in the display area A remain near zero potential (grounded state or low potential state). At this time, a signal is independently input to the third electrode 160 in the non-display area B and positive and negative voltages are output, thereby changing vertical electrophoresis to lateral electrophoresis. With reference to FIG. 2, when non-display area B works normally, that is, the third electrode 160 on the left of the first electrode 130 is applied with a positive voltage, and the third electrode 160 on the right of the first electrode 130 is applied with a negative voltage. Then, under the effect of the electric field, the first charged particles 151 gather at the positively charged third electrode 160, and the second charged particles 152 gather at the negatively charged third electrode 160. In this way, the charged particles 150 no longer exist in the display area A, thus the display area can become transparent.

Optionally, the display panel 100 of the present application further includes a plurality of first light-shielding layers 170 disposed on a side of the second substrate 120 close to the first substrate 110, and each of the plurality of first light-shielding layers 170 is disposed opposite to each of the plurality of third electrodes 160. It can be understood that the first light-shielding layer 170 is provided to prevent the non-display area B from affecting the transparent display effect of the display area A. Wherein a projected area of the first light-shielding layer 170 in the horizontal direction can be greater than or equal to a projected area of the third electrode 160 in the horizontal direction.

In the above embodiment, by designing an additional third electrode outside the display area of the display panel that is different from the electrodes in the display area, the third electrode being independently connected with signal to output positive and negative bias voltages and respectively controls different bias voltages of the first and second electrodes in the display area and the third electrode in the non-display area, the plurality of charged particles can be accumulated to the electrodes in the display area or the electrodes in the non-display area based on the different bias voltages. Therefore, switching between different working states of the display panel is realized.

Figure 3:
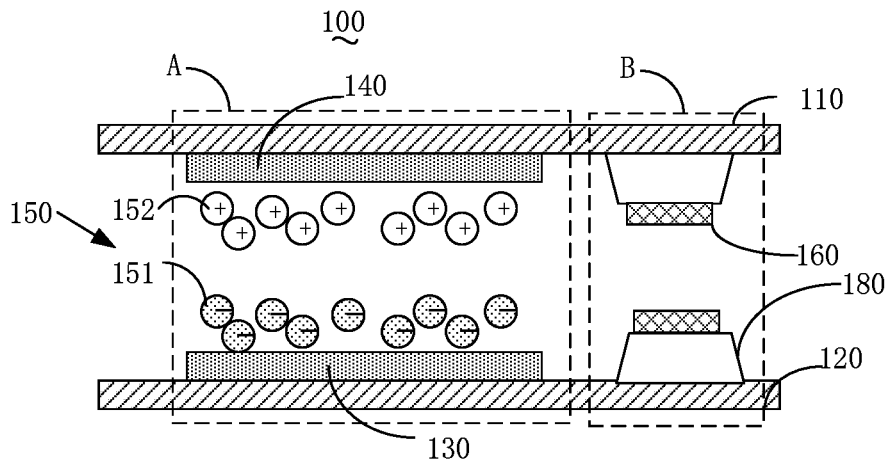
FIG. 3 is a cross-sectional schematic structural diagram of a display panel in a second embodiment of the present application.

Please refer to FIG. 3, which is a schematic cross-sectional structure diagram of a display panel in a second embodiment of the present application. It can be understood that the display panel provided by the second embodiment of the present application is an extension of the first embodiment. The difference is that the position of the third electrode in this embodiment is different from that in the first embodiment, the remaining are not repeated in this embodiment, and the specific description is as follows.

The display panel 100 provided by the present application includes the display area A and the non-display area B. The display panel 100 further includes the first substrate 110 and the second substrate 120 disposed opposite to each other, the first electrode 130, the second electrode 140, the plurality of charged particles 150, and the plurality of third electrodes 160.

The first substrate 110 can be an array substrate, and the array substrate may include a substrate (not shown) and a thin film transistor (not shown) on the substrate, wherein the thin film transistor includes at least a channel layer (not shown), a source (not shown), a drain (not shown), and a gate (not shown). The substrate can be a transparent substrate, and can specifically be a glass substrate, which is not specifically limited here.

The second substrate 120 can refer to the upper substrate structure of the current VA liquid crystal display, the difference is that there is no alignment film layer (PI layer) on the second substrate 120 in this application.

The first electrode 130 is disposed on a side of the first substrate 110 positioned in the display area A, and the second electrode 140 is correspondingly disposed on a side of the second substrate 120 close to the first substrate 110 and positioned in the display area A. Optionally, the first electrode 130 and the second electrode 140 of the present application can adopt transparent materials, such as indium tin oxide or zinc aluminum oxide (AZO), etc., which is not specifically limited herein. The first electrode 130 and the second electrode 140 in the display area A can be connected to an independent thin-film transistor (TFT) for active addressing and independent control. They can also be controlled by a passive matrix addressing signal scanning without using a TFT.

The plurality of charged particles 150 disposed between the first electrode 130 and the second electrode 140 include first charged particles 151 and second charged particles 152.

Optionally, in this embodiment, the first charged particles 151 can be black charged particles, and the second charged particles 152 can be white charged particles. Certainly, the first charged particles 151 can be white charged particles, and the second charged particles 152 can be black charged particles. Certainly, the color of the charged particles in this application can also be red, green, or blue, which is not specifically limited here. The first charged particles 151 and the second charged particles 152 have opposite electrical properties. In this embodiment, the first charged particles 151 are negatively charged, and the second charged particles 152 are positively charged.

Further, the display panel of the present application further includes a transparent electrophoretic liquid (not shown) disposed between the first substrate 110 and the second substrate 120, and a plurality of charged particles 151 move in the transparent electrophoretic liquid. When the display area A works normally, that is, when positive and negative voltages are applied to the first electrode 130 and the second electrode 140, respectively, a plurality of charged particles 150 will gather at the first electrode 130 and the second electrode 140 under an effect of the electric field, respectively. In this embodiment, the positive voltage is applied to the first electrode 130, and the negative voltage is applied to the second electrode 140. At this time, the first charged particles 151 are accumulated to the first electrode 130, and the second charged particles 152 are accumulated to the second electrode 140, thus achieving a reflective display. Conversely, the negative voltage is applied to the first electrode 130, and the positive voltage is applied to the second electrode 140. At this time, the first charged particles 151 are accumulated to the second electrode 140, and the second charged particles 152 are accumulated to the first electrode 130. In this way, a black screen in the display area can be realized.

The display panel 100 provided by the present application further includes a plurality of third electrodes 160. In this embodiment, the plurality of third electrodes 160 are respectively disposed on a side of the first substrate 110 and a side of the second substrate 120 close to the first substrate 110, and the plurality of third electrodes 160 are spaced apart from the first electrode 130 and the second electrode 140, respectively. The third electrode 160 can be transparent or translucent, or non-transparent. In a case where the third electrode 160 is transparent or translucent, the material of the third electrode 160 includes one or more of indium tin oxide (ITO), indium zinc oxide (IZO), or zinc aluminum oxide (AZO). In a case where the third electrode 160 is non-transparent, the material of the third electrode 160 includes one or more of silver (Ag), copper (Cu), and aluminum (Al).

Optionally, like the first electrode 130 and the second electrode 140, the third electrode 160 can also be connected to an independent thin-film transistor (TFT) for active addressing and independent control. It can also be controlled by a passive matrix addressing signal scanning without using a TFT.

Figure 4:
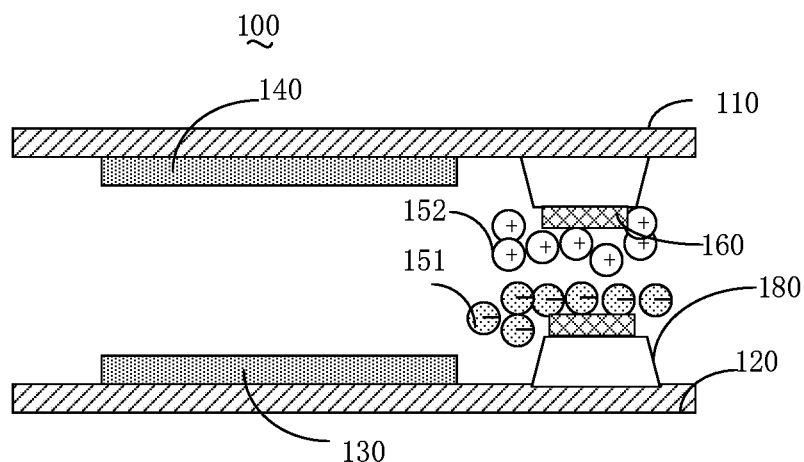
FIG. 4 is a schematic diagram of the working state of the display panel in a second embodiment of the present application.

With reference to FIG. 4, FIG. 4 is a schematic diagram of the working state of the display panel in a second embodiment of the present application. As shown in FIG. 2, when the input of the first electrode 130 and the second electrode 140 in the display area A is interrupted, that is, the electrodes in the display area A remain near zero potential (grounded state or low potential state). At this time, a signal is independently input to the third electrode 160 in the non-display area B and positive and negative voltages are output, thereby changing vertical electrophoresis to lateral electrophoresis. With reference to FIG. 4, when non-display area B works normally, that is, the third electrode 160 on the right of the first electrode 130 is applied with a positive voltage, and the third electrode 160 on the right of the second electrode 140 is applied with a negative voltage. Then, under the effect of the electric field, the first charged particles 151 gather at the positively charged third electrode 160, and the second charged particles 152 gather at the negatively charged third electrode 160. In this way, the charged particles 150 no longer exist in the display area A, thus the display area can become transparent.

Optionally, the display panel 100 further includes a plurality of second light-shielding layers 180. The second light-shielding layers 180 are disposed between the first substrate 110 and the plurality of third electrodes 160 and between the second substrate 120 and the plurality of third electrodes 160, respectively. The second light-shielding layer 180 is provided to prevent the non-display area B from affecting the transparent display effect of the display area A. In addition, a projected area of the second light-shielding layer 180 in the horizontal direction can be greater than or equal to a projected area of the third electrode 160 in the horizontal direction.

In the above embodiment, by designing an additional third electrode outside a display area of a display panel that is different from electrodes in the display area, and the third electrode is independently connected with signal to output positive and negative bias voltages, and respectively controlling different bias voltages of the first electrode and second electrode in the display area, and the third electrode in the non-display area, such that the plurality of charged particles can be accumulated to electrodes in the display area or electrodes in the non-display area based on the different bias voltages. Therefore, switching between different working states of the display panel is realized.

Figure 5:
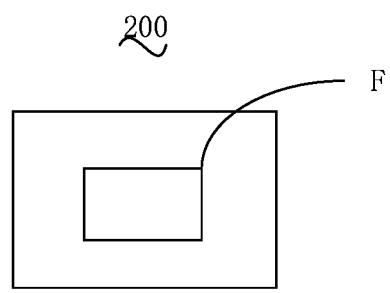
FIG. 5 is a schematic structural diagram of a display device in an embodiment of the present application.

Please refer to FIG. 5, which is a schematic structural diagram of a display device in an embodiment of the present application. The display device 200 provided by this application includes a display panel F. For the specific structure of the display panel F, please refer to the detailed description of the above-mentioned embodiment, which will not be repeated here.

As described above, those skilled in the art can easily understand that this application provides a display panel and a display device. By designing an additional third electrode outside a display area of a display panel that is different from electrodes in the display area, and the third electrode is independently connected with signal to output positive and negative bias voltages, and respectively controlling different bias voltages of the first electrode and second electrode in the display area, and the third electrode in the non-display area, the plurality of charged particles can be accumulated to electrodes in the display area or electrodes in the non-display area based on the different bias voltages, thereby realizing a capability of switching between working states of the display panel.

The above are only the embodiments of the present application, and therefore do not limit the scope of the present application. Any equivalent structure or equivalent process transformation made by using the description and drawings of this application, or directly or indirectly used in other related technical fields are all included in the protection scope of this application.

What is claimed is:

1. A display panel, comprising a display area and a non-display area, the display panel comprising:
   a first substrate and a second substrate disposed opposite to each other;
   a first electrode and a second electrode, wherein the first electrode is disposed on a side of the first substrate in the display area, and the second electrode is correspondingly disposed on a side of the second substrate close to the first substrate in the display area;
   a plurality of charged particles disposed between the first electrode and the second electrode, wherein the plurality of charged particles comprise first charged particles and second charged particles; and
   a plurality of third electrodes disposed on the first substrate and/or the second substrate in the non-display area;
   wherein the first electrode and the second electrode in the display area, and the third electrode in the non-display area are configured to enable their different bias voltages to be controlled respectively so that the plurality of charged particles can be accumulated to electrodes in the display area or electrodes in the non-display area based on the different bias voltages to realize switching between different working states of the display panel.

2. The display panel of claim 1, wherein the plurality of third electrodes are positioned on the first substrate and disposed spaced apart on both sides of the first electrode.

3. The display panel of claim 2, further comprising a plurality of first light-shielding layers disposed on the side of the second substrate close to the first substrate, and each of the plurality of first light-shielding layers is disposed opposite to each of the plurality of third electrodes.

4. The display panel of claim 1, wherein the plurality of third electrodes are disposed on the side of the first substrate and the side of the second substrate close to the first substrate, and the plurality of third electrodes are spaced apart from the first and the second electrodes.

5. The display panel of claim 4, further comprising a plurality of second light-shielding layers, wherein the plurality of second light-shielding layers are disposed between the first substrate and the plurality of third electrodes and between the second substrate and the plurality of third electrodes.

6. The display panel of claim 1, wherein the first charged particles are white charged particles and the second charged particles are black charged particles; or, the first charged particles are black charged particles and the second charged particles are white charged particles, and electrical properties of the first charged particles and the second charged particles are opposite.

7. The display panel of claim 1, wherein the first substrate is an array substrate, the array substrate comprises a substrate and a thin film transistor positioned on the substrate, and wherein the thin film transistor comprises at least a channel layer, a source, a drain, and a gate.

8. The display panel of claim 1, wherein the first electrode and the second electrode are transparent conductive materials, and the third electrode is a transparent or translucent conductive material.

9. The display panel of claim 1, further comprising a transparent electrophoretic liquid disposed between the first substrate and the second substrate, and the plurality of charged particles move within the transparent electrophoretic liquid.

10. A display device, comprising a display panel; wherein the display panel comprises:
   a first substrate and a second substrate disposed opposite to each other;
   a first electrode and a second electrode, wherein the first electrode is disposed on a side of the first substrate in a display area, and the second electrode is correspondingly disposed on a side of the second substrate close to the first substrate in the display area;
   a plurality of charged particles disposed between the first electrode and the second electrode, wherein the plurality of charged particles comprises first charged particles and second charged particles; and
   a plurality of third electrodes disposed on the first substrate and/or the second substrate in a non-display area;
   wherein the first electrode and the second electrode in the display area, and the third electrode in the non-display area are configured to enable their different bias voltages to be controlled respectively so that the plurality of charged particles can be accumulated to electrodes in the display area or electrodes in the non-display area based on the different bias voltages to realize switching between working states of the display panel.

11. The display panel of claim 10, wherein the plurality of third electrodes are positioned on the first substrate and disposed spaced apart on both sides of the first electrode.

12. The display panel of claim 11, further comprising a plurality of first light-shielding layers disposed on the side of the second substrate close to the first substrate, and each of the plurality of first light-shielding layers is disposed opposite to each of the plurality of third electrodes.

13. The display panel of claim 10, wherein the plurality of third electrodes are disposed on the side of the first substrate and the side of the second substrate close to the first substrate, and the plurality of third electrodes are spaced apart from the first and the second electrodes.

14. The display panel of claim 13, further comprising a plurality of second light-shielding layers, wherein the plurality of second light-shielding layers are disposed between the first substrate and the plurality of third electrodes and between the second substrate and the plurality of third electrodes.

15. The display panel of claim 10, wherein the first charged particles are white charged particles and the second charged particles are black charged particles; or, the first charged particles are black charged particles and the second charged particles are white charged particles, and electrical properties of the first charged particles and the second charged particles are opposite.

16. The display panel of claim 10, wherein the first substrate is an array substrate, the array substrate comprises a substrate and a thin film transistor positioned on the substrate, and wherein the thin film transistor comprises at least a channel layer, a source, a drain, and a gate.

17. The display panel of claim 10, wherein the first electrode and the second electrode are transparent conductive materials, and the third electrode is a transparent or translucent conductive material.

18. The display panel of claim 10, further comprising a transparent electrophoretic liquid disposed between the first substrate and the second substrate, and the plurality of charged particles move within the transparent electrophoretic liquid.

* * * * *